United States Patent [19]

Houck, Jr.

[11] Patent Number: 4,594,797

[45] Date of Patent: Jun. 17, 1986

[54] AIR TOWEL

[76] Inventor: Jasper C. Houck, Jr., 6513 S. Donna La., Oklahoma City, Okla. 73150

[21] Appl. No.: 666,674

[22] Filed: Oct. 31, 1984

[51] Int. Cl.$^4$ .............................................. F26B 19/00
[52] U.S. Cl. ...................................... 34/225; 34/233; 34/243 R
[58] Field of Search ................. 34/233, 243 C, 243 R, 34/222, 229, 225

[56] References Cited

U.S. PATENT DOCUMENTS

| | | | |
|---|---|---|---|
| 2,977,455 | 3/1961 | Murphy | 219/39 |
| 3,128,161 | 4/1964 | Hudon | 34/233 |
| 3,409,995 | 11/1968 | Greenwood et al. | 34/243 C |
| 3,449,838 | 6/1969 | Chancellor, Jr. | 34/233 |
| 3,621,199 | 11/1971 | Goldstein | 219/370 |
| 3,711,958 | 1/1973 | Lepage | 34/88 |
| 3,878,621 | 4/1975 | Duerre | 34/233 |

*Primary Examiner*—Larry I. Schwartz
*Attorney, Agent, or Firm*—Fisher, Christen & Sabol

[57] ABSTRACT

A drying device has a blower, a motor for driving the blower, a switch for actuating the blower motor unit, and the heating elements in the duct supplying the blower. The air supplied is received by an air towel having an open upper edge, a back wall, a front wall, and tapering side walls. Air exits the air towel from a slot disposed in the front wall of the enclosure member. The rear wall of the enclosure member also tapers gradually toward the bottom-most portion of the slot, as do the side walls of the enclosure member, so that, with diminishing volume enclosed by the enclosure member, a generally uniform air velocity of air flow outward from the slot along the vertical length thereof. The air is directed downwardly generally at a 45° angle. Also, a flexible hose having a nozzle has an end in communication with the air supplied; the end in communication with the air supply penetrates a side wall of the enclosure member to receive air from the enclosure member. This permits hand manipulation of the flexible hose and nozzle to supply additional air at any desired location within the reach of the flexible hose. Upstanding flanges are provided to protrude beyond a wall or flush to the wall, so that the enclosure member can be concealed behind the wall while leaving only an aesthetic slot opening and the flexible hose visible, as well as an enclosure member portion which directly lies behind the flexible hose.

7 Claims, 10 Drawing Figures

AIR TOWEL

BACKGROUND OF THE INVENTION

This invention relates to an air heater and blower assembly for discharging air at a generally uniform velocity along the length of an elongated slot, the assembly being installed in a wall of a building, or as a free standing self contained unit. The invention may be used to dry human beings or animals such as horses, for example but is not limited thereto.

It is well known to use portable air heaters and blowers to discharge air at a relatively high velocity for drying. For example, portable hair dryers are of this type.

It is also known, from U.S. Pat. No. 3,878,621, to Duerre, to use a heater in a bathroom having elongated slots for drying the human body and hair.

It is also known to use a flexible hose in combination with an air heater and blower as shown in U.S. Pat. No. 3,449,838 to Chancellor, Jr. Another type of body drying apparatus is shown in U.S. Pat. No. 3,621,199 to Goldstein. Here, the whole body of a person may be dried by the passage of hot air; a deflector is arranged to deflect a stream of hot air from an outlet, the deflector being oscillated so as to cause the stream of air to sweep upward and downward over the body.

Other U.S. Patents relate to an after-shower body dryer, as shown in the patent to Hudon, U.S. Pat. No. 3,128,161 showing a plurality of heated air outlets with air being heated by an element and a blower being arranged in a conduit to provide the air supply. In U.S. Pat. No. 2,977,455 to Murphy, a body dryer is shown having an electrical heating element, switches arranged together with other structure for use in blowing heated air across a human body. A perforated plate is used to distribute the air across a central portion of the plate.

In another type of device, heated air is used in combination with a blower to inflate generally flexible, flaccid bag members so as to rub against the body of a person, the bag being generally absorbant and porous. Here, contact of a human body with the bag while the bag is inflated with heated air, causes drying by physical contact of the bag member with the body together with air flow carrying moisture away from the bag member. Some convection moisture removal will be caused by the generally low air flow speed through the bag member, however this is not the primary drying mode.

SUMMARY OF THE INVENTION

It is accordingly one object of the present invention to provide an improved drying device which is inexpensive to fabricate, requiring no complex equipment in the manufacture thereof, and that is formed of readily available materials and that can be manufactured and installed by persons of ordinary skill in the art.

Another object of the invention is to provide an improved drying device having a single elongated slot which is so shaped to uniformally distribute air along the length thereof without resort to baffle members or damper members or the like.

Another object of the present invention is to provide a drying device having an elongated slot member with uniform air flow together with a flexible hose member in a single unit.

A further object of the present invention is to provide an drying device including a pneumatic air switch for turning on the device so that a person, while wet, does not risk shock by contact with any electrical devices.

A still further object of the present invention is to provide a drying device which can be molded into a suitable form during a molding operation so as to provide a proper shape to provide uniform air distribution along an elongated slot.

This drying unit, hereafter called an air towel, of the present invention can be flush mounted on a wall in a shower or over a bathtub and switched on and off by an air switch. This air switch preferably trips a relay which activates a high voltage current to a heating element, such as used in a central heating unit. A blower motor unit is also actuated, and blows air across the heating device so that the air is heated.

The heated air is then directed selectively toward either a nozzle attached to a flexible hose or to an elongated slot, or to both. The air passing along the elongated slot flows generally uniformally out of the slot at approximately 45° angle downward to the wall due to the specific configuration of the ducting behind the elongated slot. The ducting behind the elongated slot has a generally uniformly diminishing cross section to compensate for the loss of air pressure along the length of the slot. It is the air pressure which determines the velocity and direction of air flow at any given point along the length of the slot.

The air slot directs air at approximately a 45° angle downwardly from the wall. This is advantageous in drying the feet and lower legs of a person. Since the lowermost edge of the slot is approximately 18 inches above floor level, such downwardly directed air allows drying of the entire body of a person or animal. This is an improvement over the prior art.

Also, the present invention is electrically isolated from the person or object being dried. This too is an important advantage of the present invention over the prior art, making possible safe use of the invention by a person standing in a shallow pool of water, for example in a draining bathtub or shower stall.

The hose can be of any ordinary type, and which can be adjustable so as to open or close a nozzle opening, so that a concentrated and higher velocity and volume of air is available to be directed to various parts of the body, for example the hair, or to a surface such as a mirror which might tend to fog.

After installation, only the slot for air discharge and the slot containing the flexible hose will ordinarily be visible in the wall, the unit being sized to fit between standard stud members separated by generally 14.5 inches from edge to edge. The blower and motor unit; heating element and airduct preferably are disposed above the ceiling of the room in which the air towel has been installed but can be mounted in furr-downs in rooms that have no space above the ceiling. Air is drawn from an inlet duct, which will be located in the ceiling or furr-down as required, so as to receive air from the same room into which the air towl blows.

The air towel device may be made of any moldable material. Also, any suitable material can be used without departing from the scope of the present invention. In particular, vinyl resins, polyester, or its copolymers, moldified vinyls, or other types of plastics may be used.

Further details and advantages of the present invention appear from the following description of a preferred embodiment shown schematically in the drawings.

DETAILED DESCRIPTION OF THE INVENTION

Figure 1:
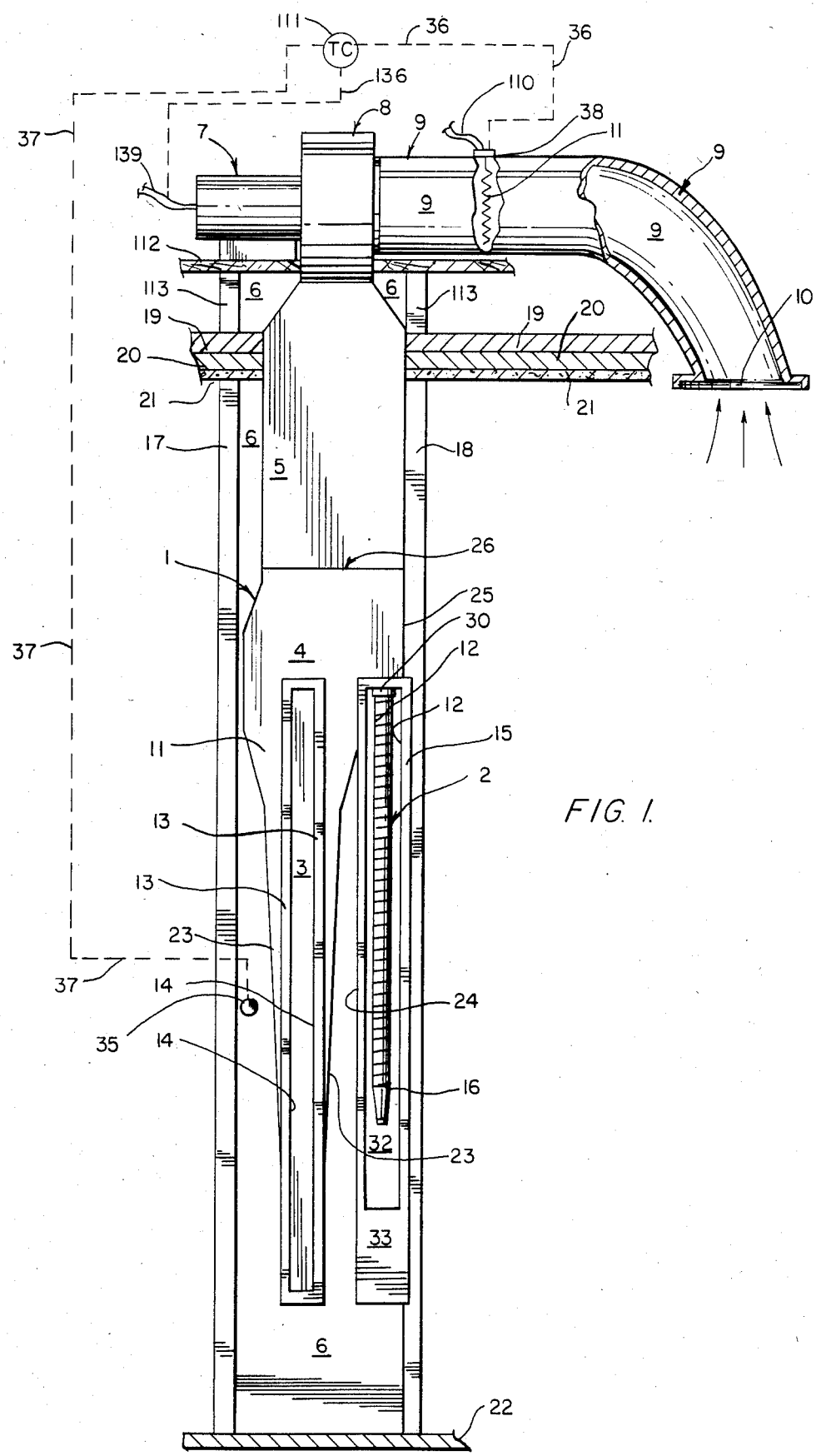
FIG. 1 shows a front elevational view of the drying unit of the present invention, as it would be assembled in a wall together with the necessary duct work and other equipment shown in the drawing.

FIG. 1 is a front elevational view of the air towel of the present invention as it would be assembled in a wall of a house having generally standard, conventional, dimensions between wall studs. The air towel is indicated generally by the numeral 1.

Numeral 2 indicates a flexible hose used to selectively direct air supplied to the air towel, the air flow being controllable by a nozzle 16. The flexible hose is connected to the end of the body of the air towel 1 by a member 30.

As seen in FIG. 1, an air inlet 10 draws external air into a duct 9. The duct 9 is shown as partially broken away in FIG. 1. The air inlet 10 will ordinarily be disposed in the ceiling or in a furr-down of a room. Nonetheless, it is contemplated as being within the scope of the present invention that the air inlet can be placed at any desired location. For example, it can be located to draw in fresh air from outside the house or building in which the air towel itself is located, or from another room of the same building. A conventional heating element 38, indicated schematically in the figure, is disposed in the duct 9. The heating element is preferrably an electrical heating element having a power supply (preferrably 220 volts, although 110 volts can be used) which is controlled by a control member 111 having a controller communication line 36 which selectively opens or closes the electrical power supply to the heating element 38. The electrical wires indicated by numeral 110 in FIG. 1 represent the physical connection to a power supply.

The air is drawn through the duct 9 by a blower 8, the blower 8 being driven by a conventional motor 7. Any type of drive for the air may be used, using any conventional blower or motor members, without departing from the scope of the present invention.

The blower motor 7, 8 is supported by a plywood panel 112, which is in turn supported by a pair of ceiling joists 113. As seen in FIG. 1, the blower supplies air to duct 5. The wall behind duct 5 is indicated generally as wall 6.

A pair of studs 17 and 18 are shown, having a spacing between the innermost edges thereof of 14 and ½ inches. Each stud is generally a 2 inch×4 inch stud on a 16 inch center, as is conventional in construction of houses. The air towel 1 is sized to fit in between such studs in standard housing and other building constructions. This permits easy retro-fitting of the device into existing houses and other buildings.

The air duct 5 supplies air to the air towel 1 along the top edge 26 of the air towel 1. The air towel 1 has a front surface 4, a right upper side surface 25, a lower diminishing front surface 11 and a lower pair of converging side walls 23. A rear surface 28 of the air towel 1 is visible through a slot opening 14 formed in the front wall of the air towel 1. Slot 14 is defined by the inner perimeter of the upstanding flange member 13 which forms a continuous periphery about the slot 14. When in finished installed form, only the flange 13 of the slot 14, and the corresponding flange 15 of the recess 12, protrude beyond a wall which conceals the structure of the present invention, as seen generally in FIG. 5.

The recess 12 has an innermost backwall 212, and the flange 15 has an outermost edge 27 as shown in FIG. 1. The flange 15 is enlarged at its lowermost portion 33 for aesthetic purposes.

The elongated slot 14 is configured to direct a generally uniform air flow outwardly and downwardly at an angle of approximately 45° along the length thereof, with sufficient speed of air flow to permit drying of a wet person or animal. Therefore, the blower motor unit 7, 8 and the slot must all be sized to permit a sufficiently large air flow to permit rapid drying. Also, the air flow must be generally uniform for greater drying efficiency, so that one area of a person or object to be dried does not become immediately dry while other areas take much longer to become dry; the present design, which causes generally uniform air flow along the length of slot 14, is designed (as shown in the figures) to cause generally uniform air flow along the length thereof.

A button 35 is provided to actuate the blower and heating elements to start the air towel 1 in operation. Preferably, a pneumatic line 37 sends a signal to a conventional temperature controller 111 to actuate a relay which would close the circuit to selectively turn on or off the blower and heating elements of the present invention. A control line 136 communicates such a control signal to an electrical power supply 139 (at preferrably 220 volts) of the motor 7. Thus, the device is electrically insulated from the wet person or animal, since the pneumatic line is of an insulating material, as is, preferably, the material of the air towel 1, which may be of any type of plastic or moldable insulating material in the preferred embodiment. However, wood or any other properly insulated material can be used without departing from the scope of the present invention.

As seen in FIG. 1, the duct member 5 penetrates the ceiling of a room having a top plate 19 which is generally 1 and ½ inches thick; a middle plate 20 which is a 1 and ½ inch thick plate; and a lower member 21 forming the ceiling, which is of ½ inch sheet rock. The floor of the room is indicated generally at 22 in FIG. 1. The air towel 1 therefore can be seen as fitting in a conventional building structure such as exists in a home. The bottommost edge of each slot member generally terminates approximately 18 inches above the floor 22. Any conventional temperature controller or relay device 111 can be used in conjunction with the button 35. Furthermore, any type of shock-proof insulated actuating device can be used instead of a button 35.

Figure 2:
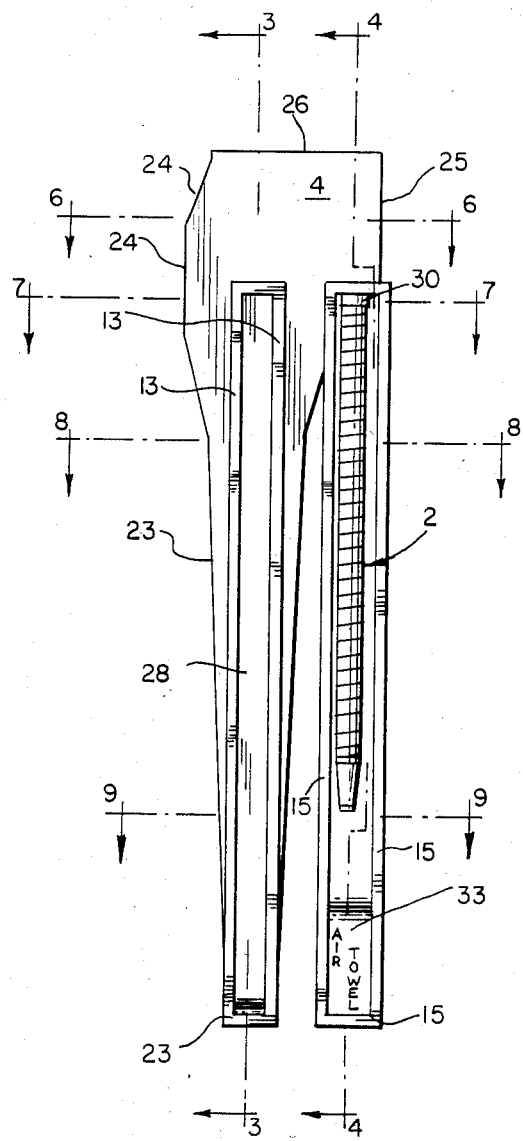
FIG. 2 is a front elevational view of the drying unit of the present invention as it appears isolated from the duct work and from a wall.

FIG. 2 is a view of the air towel 1 as shown in FIG. 1, and additionally indicates the upper left-most surface 24 of the device. This is the unit which would be generally sold commercially, or which can be provided in kit form together with the other elements shown in FIG. 1. On the surface 33, the name of the device is seen in FIG. 2. However, any type of indicia may be provided thereon, since surface 33 is provided mainly for aesthetic purposes.

Figure 3:
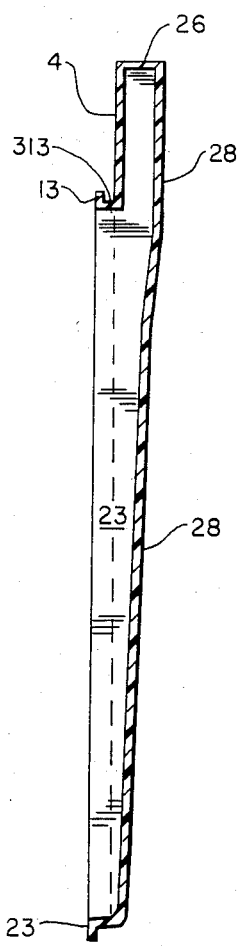
FIG. 3 is a side sectional view taken along line 3—3 of FIG. 2.

FIG. 3 is a side sectional view of the device of FIG. 2 as taken along line 3—3 of FIG. 2. The side surface 23 is visible, as is rear wall 28 connecting the flange 15 to the surface 313 of the unit. As seen, the top is open to receive air from the blower 8.

As seen in FIG. 3, the back wall 28 of the unit tapers inwardly initially and then tapers more gradually and uniformly toward the bottom. This provides for uniform air flow, by providing a greater interior volume where the slot initially begins and tapering to a much smaller enclosed interior volume where the slot ends. This tends to produce a generally uniform velocity across the vertical length of the slot, as well as causing the air to flow downwardly at an angle to the wall.

Figure 4:
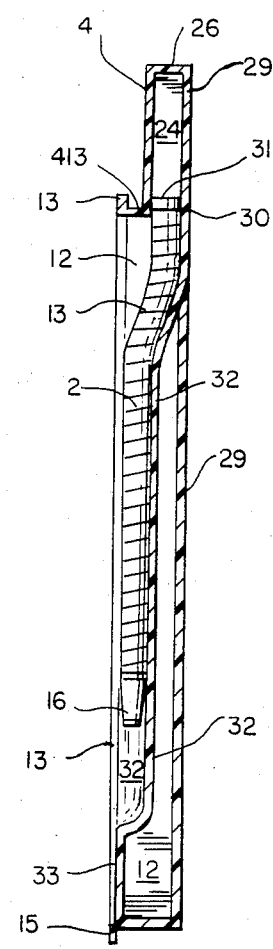
FIG. 4 is a sectional side view taken along line 4—4 of FIG. 2.

FIG. 4 is a side sectional view taken generally along line 4—4 of FIG. 2. This shows a back wall 32 of the air hose enclosure. An uppermost rear wall portion 29 is shown, connected to sidewall 12 and, at an upper portion, is connected to wall 32. A wall 413 connects flange 15 to the front surface 4. A wall 212 separates hose 2 from the rear wall 32. The nozzle 16 can be in a closed or open position (such as is conventional in the nozzle art; any conventional type of nozzle and flexible hose 2 may be provided) so that air selectively does not pass through the hose 2, if desired. Instead, all of the air flow would be directed along the slot 14 (indicated in FIG. 1).

Figure 5:
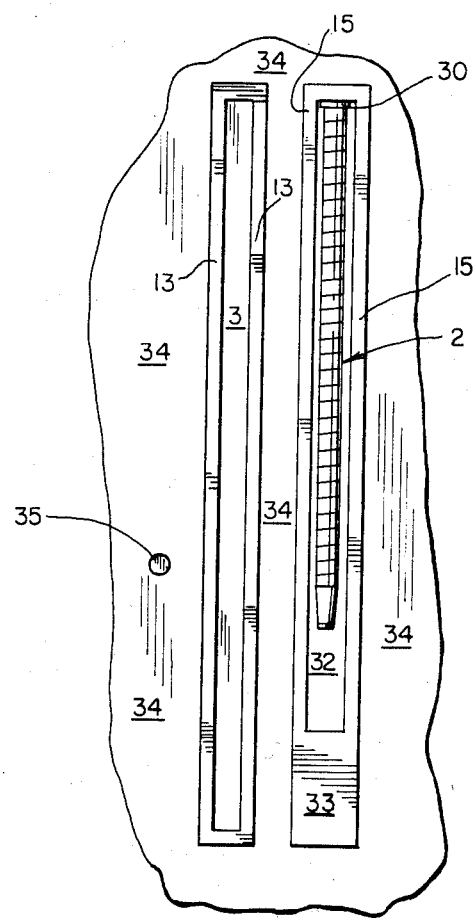
FIG. 5 is a front elevational view of the unit as it appears after being installed in a wall, only the slots being generally visible.

The installed device is shown in FIG. 5. Here a wall 34 has been provided to cover the equipment and studs shown in FIG. 1. The button 35 projects beyond, or optionally is accessible through an opening in the wall 34, and the overall effect is aesthetic and pleasing.

The FIGS. 6, 7, 8, 9, and 10 show clearly the structure of the device 1.

Figure 6:
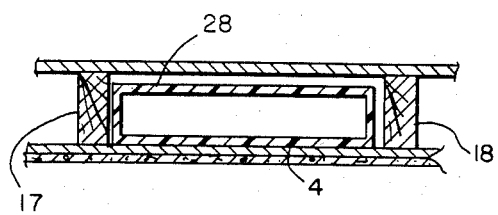
FIG. 6 is a sectional view taken along line 6—6 of FIG. 2.

FIG. 6 is a sectional view taken along line 6—6 of FIG. 2, showing walls 4 and 28 of the device mounted in a wall.

Figure 7:
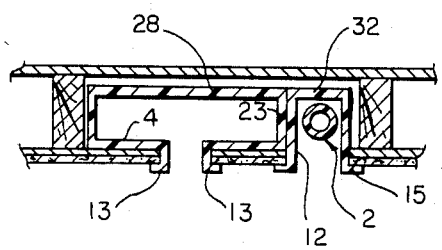
FIG. 7 is a sectional view taken along line 7—7 of FIG. 2.

FIG. 7 is taken along line 7—7 of FIG. 2, and is similar to FIG. 6. Wall 12 separates tube 2 from wall 4. Rear wall 32 is shown and is co-linear with rear wall 28. The flush mounting of the flunges 13, 15 to the wall (unnumbered).

Figure 8:
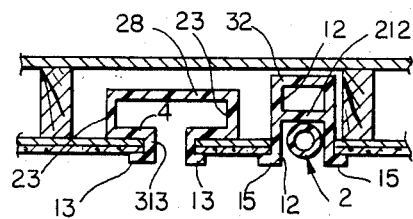
FIG. 8 is a sectional view taken along line 8—8 of FIG. 2.

FIG. 8 is similar to FIG. 7, and is taken along line 8—8 of FIG. 2. Here, the diminishing cross-sectional area enclosed by the walls 28, 23, and 4 is clearly seen, as is the increasing separation between walls 212 and 32. Partition member 212 is visible adjacent to hose 2.

Figure 9:
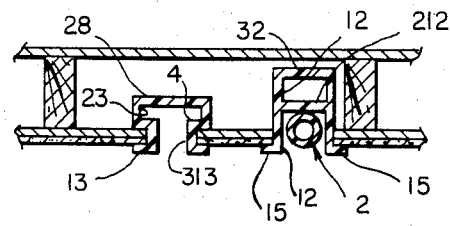
FIG. 9 is a sectional view taken along line 9—9 of FIG. 2.
Figure 10:
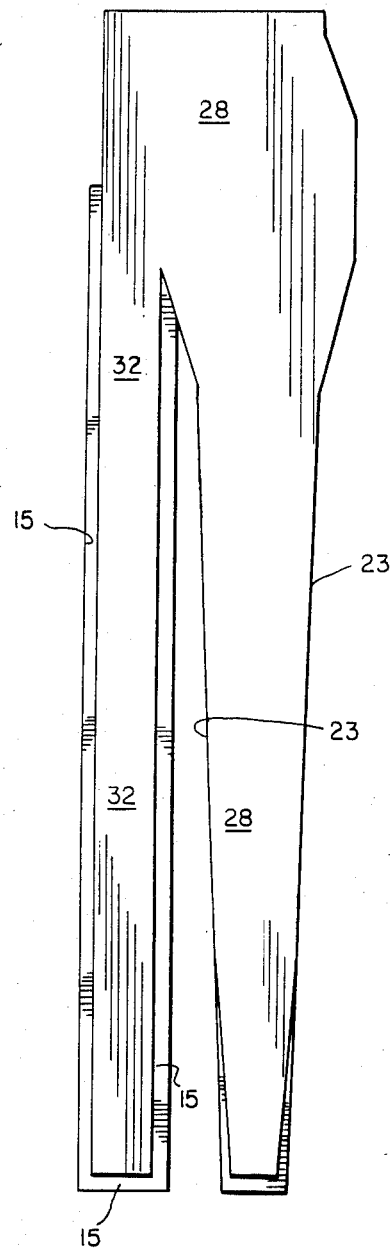
FIG. 10 is a rear elevational view of the device of FIG. 2.

FIG. 9 is similar to FIG. 8, and shows further diminishing of the cross-sectional areas enclosed by the walls 28, 23 and 4. The wall may include, for example, sheetrock and tile, among other types of the wall materials.

It is also contemplated as being within the scope of the present invention to provide the air towel as a portable unit. This is advantageous, for example, for use at swimming pools, by the lake or shore, and so on.

The improved air towel of the present invention is capable of achieving the above-enumerated objects and while a preferred embodiment of the present invention has been disclosed, it will be understood that it is not limited thereto but may be otherwise embodied within the scope of the following claims.

What is claimed is:

1. A device for providing heated air for drying comprising:
   a means for supplying air to an inner enclosure;
   a means for heating air including an electrically operated component;
   air drawn into said means for supplying the air being heated by said means for heating air;
   said inner enclosure having a top edge in communication with said means for supplying air; said inner enclosure having a front wall, a rear wall, and side walls;
   an elongated slot being provided in said front wall;
   said elongated slot being generally vertical;
   said side walls of said inner enclosure member tapering generally smoothly from a region intermediate a top edge and a bottom edge of said slot;
   said inner enclosure being composed of electrically insulating material; said inner enclosure being adapted for mounting within an outer enclosure having an outer wall such that said front wall of said inner enclosure is adjacent said outer wall;
   said outer wall having a first elongated opening therein communicating with said elongated slot;
   said outer wall having an interior surface and an exposed surface; said front wall of said inner enclosure being mounted adjacent said interior surface;
   said front wall of said inner enclosure having an upstanding flange fixed thereto bordering said elongated slot; said upstanding flange penetrating said first elongated opening in said outer wall;
   a means for actuating said means for heating air; said means for actuating being manually actuable and being electrically isolated to prevent electrical shock during manual actuation thereof;
   whereby said inner enclosure and said means for actuating are shockproof; and
   whereby air velocity of air leaving said slot is generally uniform along the length of said slot.

2. A device for drying as claimed in claim 1, further comprising a flexible hose for selectively directing air flow; an end of said flexible hose communicating with said inner enclosure member so as to supply air through said flexible hose, so that air may be directed by manipulation of said flexible hose.

3. A device for drying as claimed in claim 2, wherein said flexible hose has a nozzle member at the end thereof opposite said end in communicating with said inner enclosure member.

4. A device for drying as claimed in claim 3, further comprising upstanding sidewalls surrounding a recessed backwall; said upstanding sidewalls and said recessed backwall being exposed through a second elongated opening in said outer wall; said upstanding sidewalls and said recessed backwall partially enclosing said flexible hose.

5. A device for drying as claimed in claim 3, wherein said rear wall of said inner enclosure member tapers generally smoothly beginning at a vertical location disposed at a height which is intermediate a height of said top edge of said slot and said bottom edge of said slot.

6. A device for drying as claimed in claim 5, wherein said side walls of said inner enclosure taper generally sharply beginning at a vertical height just below said top edge of said slot.

7. A device for drying as claimed in claim 3, further comprising an upper plenum chamber supplying air to said slot and to said flexible hose.

* * * * *